Figure 1:
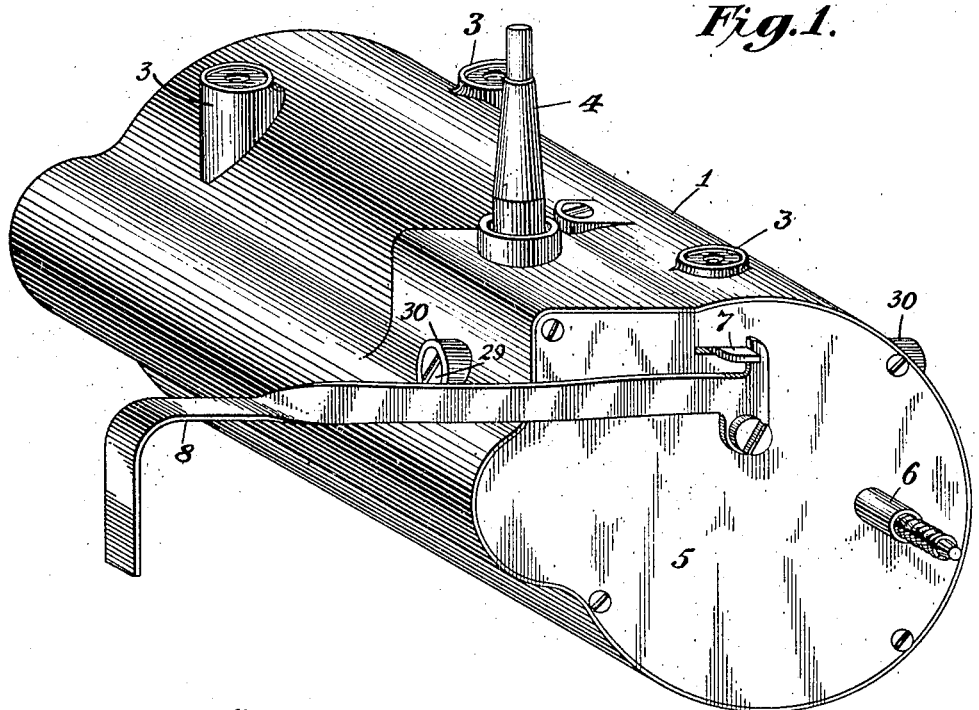

L. P. VALIQUET.
SPRING MOTOR FOR TALKING MACHINES.
APPLICATION FILED OCT. 17, 1917.

1,286,154.

Patented Nov. 26, 1918.
2 SHEETS—SHEET 1.

INVENTOR
Louis P. Valiquet
BY
Frank L. Dyer
ATTORNEY

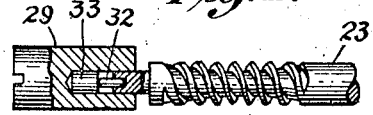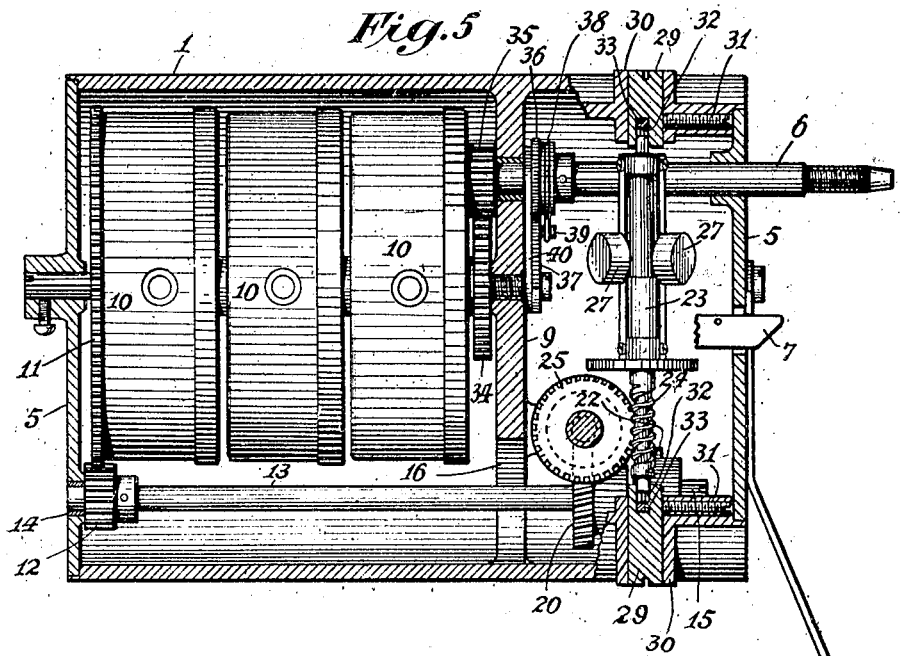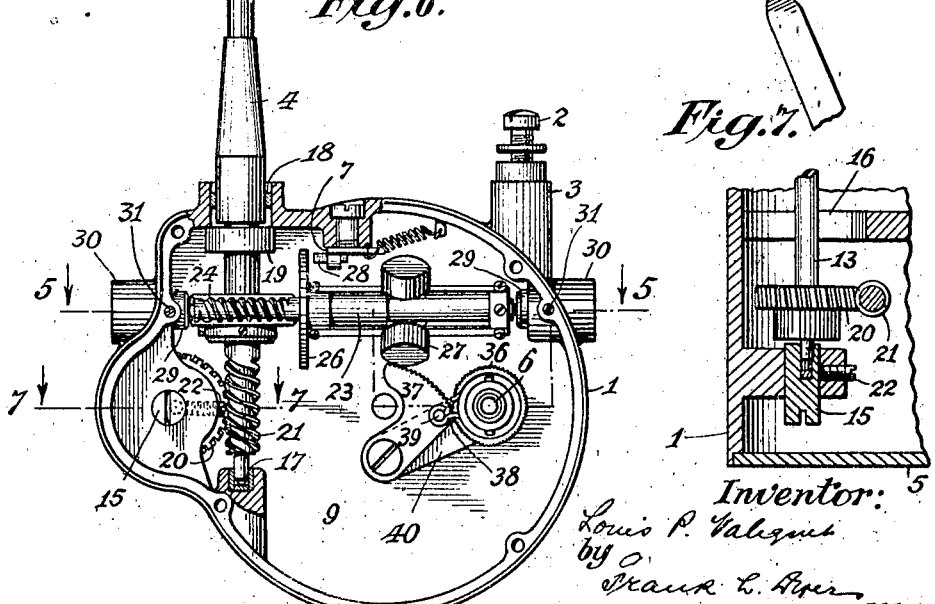

UNITED STATES PATENT OFFICE.

LOUIS P. VALIQUET, OF ELYRIA, OHIO.

SPRING-MOTOR FOR TALKING-MACHINES.

1,286,154.

Specification of Letters Patent.

Patented Nov. 26, 1918.

Application filed October 17, 1917. Serial No. 197,026.

*To all whom it may concern:*

Be it known that I, LOUIS P. VALIQUET, a citizen of the United States, residing in Elyria, county of Lorain, State of Ohio, have invented a certain new and useful Improvement in Spring-Motors for Talking-Machines, of which the following is a specification.

My invention relates to various new and useful improvements in motors for talking machines and my object is to provide a simple, compact, and highly efficient motor for the purpose. In the construction of a satisfactory talking machine motor as a commercial product, it is necessary that the design shall be such as will permit the motors to be turned out at low cost and accurately to gage. The construction, therefore, must be simple and such as will lend itself as much as possible to machine work. The limited energy which can be obtained from a series of springs makes it necessary that friction losses shall be very small and hence there should be as few wearing parts as possible; all bearings should be rigid and substantial and there should be provision for excessively fine adjustments. Anything like rumbling and grinding is to be avoided not only because of friction losses implied therefrom, but because of the production of annoying foreign sounds which may interfere with the reproduction. Even in the case of the winding operation, it is desirable that all noise should be eliminated, such as that produced when pawls are used, because in a purely psychological sense it is desirable to remove as much as possible from the auditor the idea that mechanism is connected in any way with the artistic rendition of a selection. A satisfactory talking machine motor should furthermore be of such construction as to permit its operating parts to be kept well lubricated and this is especially important in connection with the spring barrels, which should at all times be free to turn readily as the springs unwind without the annoying "chugging" frequently heard with badly designed or improperly lubricated motors. Finally an efficient spring motor for the purpose should not only be compact, so far as bulk is concerned, but its shape should lend itself to securing the greatest possible size of amplifier with inverted horn machines, which have practically displaced the old fashioned types. The improved motor which I have invented complies with all of the foregoing requirements. Its operating parts, including the spring barrels, are inclosed in a substantial casing, giving great stiffness to all bearings and securing very great smoothness of operation. This inclosing casing also acts as a shield to cut off any sounds from the motor, and in operation even when the ear is held close to the casing no sounds whatever can be heard. This inclosing casing also permits the parts to be very effectively lubricated since the springs can operate practically in a bath of oil or grease which drops down on to their bearings and prevents any possibility of sticking or "chugging."

The various shafts are mounted within the casing in such a way as to permit excessively accurate adjustments to be secured while at the same time friction is reduced to a minimum, as I will more fully hereinafter describe and claim.

In order that the invention may be better understood, attention is directed to the accompanying drawings, forming part of this specification, and in which—

Figure 1 is an isometric view of the complete motor.

Figure 2:
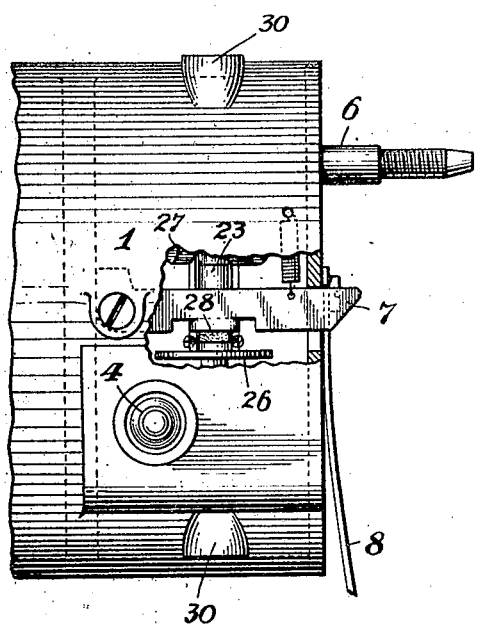

Fig. 2 a partial plan view broken away to show a portion of the governor and the governor lever.

Figure 3:
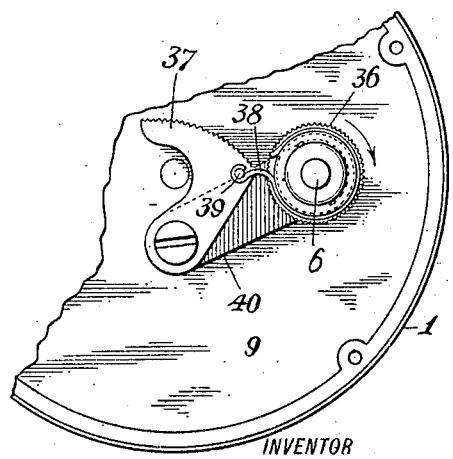

Fig. 3 an enlarged view illustrating the noiseless spring check, the parts being in the winding position.

Fig. 4 an enlarged detail sectional view at one end of the governor shaft and bearing.

Fig. 5 a horizontal sectional view partly in elevation on the plan of the line 5—5 of Fig. 6.

Fig. 6 an end elevation of the motor with the end cover plate removed and

Fig. 7 a detail sectional view on the plan of the line 7—7 of Fig. 6.

In all of the above views corresponding parts are represented by the same reference numerals.

Referring first to Fig. 1, it will be observed that the motor viewed externally comprises a casing 1, which may be conveniently made as a die casting. The casing 1 is generally cylindrical in shape, and is mounted horizontally immediately below the bed of the talking machine, being held in place by screws 2, engaging bosses 3—3 cast with the casing 1. The motor thus hugs the bed plate very closely and its vertical dimension is much less than with a vertically disposed motor, and hence opportunity is offered for the use of an amplifier of maximum size. Projecting upward through the casing is the usual turn-table shaft 4, to which is applied the turn-table of the talking machine. The casing 1 is provided with end plates 5—5 through one of which extends the winding shaft 6, to which the usual winding crank is applied. Projecting through the same end plate is the governor lever 7, by which the speed is controlled and this governor lever is operated by lever 8, with which coöperates the usual speed regulating screw, not shown.

It will be observed that the motor, viewed externally, is very compact and is entirely inclosed, except for the turn-table shaft 4, the winding shaft 6 and the governor lever 7. The interior parts are, therefore, protected from dust and dirt and the casing acts to cut off any foreign sounds which may be developed therein. The casing 1 is provided with an integral partition 9, on one side of which are located the spring barrels 10—10—10, three being shown, but obviously any number of spring barrels may be used. These spring barrels are connected in series in the usual way and by a gear 11 drive a pinion 12 on the countershaft 13. This countershaft is mounted at one end in the bearing 14 in one of the end plates 5, and at the other end it is mounted in an eccentric bearing 15 (see Fig. 7). The countershaft 13 passes through an opening 16 in the partition 9. The lower end of the turn-table shaft 4 is mounted in a bearing 17, preferably of the type which I will describe in connection with the governor shaft so that there may be as little friction as possible. A bearing 18 surrounds the turn-table shaft at the upper part of the casing 1 but, as is well known, there is very little friction at this point since the turn-table practically spins on the bearing 17 like a top. The turn-table shaft is provided with a collar 19 to prevent endwise movement. The bearings of the turn-table shaft 4 are fixed and the other shafts are adjusted with respect to the same. The countershaft 13 is provided with a worm gear 20 coöperating with and driving a worm 21 on the turn-table shaft. By slightly turning the eccentric bearing 15, a very accurate adjustment can be secured between the worm gear 20 and the worm 21, after which the bearing 15 will be locked by the set screw 22. I find in practice that the necessary adjustment of the countershaft 13 is so slight that this adjustment can be effected at one end only, as explained, without appreciably cramping the bearing 14, by which expedient I materially simplify the construction. The governor shaft 23 is provided with a worm 24, which coöperates with and is driven by a worm gear 25 on the turn-table shaft in the usual way. This governor shaft carries the ordinary governor disk 26, which is adapted to be moved longitudinally on the shaft, by the centrifugal weight 27, coming in contact with the pad 28 on the lever 8 when the desired speed is reached. The governor shaft 23 is mounted in eccentric bearings 29 (see Fig. 4), which bearings are located in bosses 30 cast with casing 1 and which are adapted to be locked when properly adjusted by the set screws 31—31. By turning the bearings 29, the worm 24 may be very accurately adjusted with respect to the worm gear 25. The governor shaft 23, as is well known, is subjected to considerable thrust and in order to reduce friction as much as possible, I make use of a pivot 32 in each end thereof, coöperating with a block 33 in each of the bearings 29. The pivot 32 is preferably a piece of piano wire, whose end is rounded off and the block 33 is made preferably of hardened steel. As is well known, piano wire is made hard by pressure and not by tempering. The thrust block 33 in each bearing is, on the other hand, preferably hardened by tempering. I find in actual practice that when a pressure hardened pivot thus engages a tempered steel block, a perfect bearing surface is secured in which there is very little friction and almost no wear. Furthermore, by using a separate pivot 32, as explained, it is not necessary to harden the entire shaft 23, and thus it may be worked up more cheaply. The bearing for the turn-table shaft is preferably of the same construction as I have described, being provided on its lower ends with a pivot of piano wire coöperating with a tempered steel block.

In the drawing (see Fig. 7) I have illustrated the countershaft 13 as being provided with a similar bearing at its adjustable end, but this is not so important with this shaft as with the turn table shaft and governor shaft, since there is very little end thrust imposed thereon.

Referring now to the mechanism by which the springs are wound, a gear 34 is mounted on the inner spring barrel and meshes with the gear 35 on the inner end of the winding shaft 6, which is supported by bearings as shown in the partition 9 and end plate 5. The winding shaft 6 is provided with a knurled wheel 36 thereon, with which coöperates a pivoted knurled cam 37. This knurled cam 37 engages with the wheel 36 (see Fig. 6) in the unwinding direction so as thereby to lock the winding shaft 6. During the winding of the springs, when the shaft 6 is moved in the direction of the arrow (see Fig. 3) the cam 37 is automatically moved out of engagement with the wheel 36 as shown in Fig. 3, so as thus to make the winding operation absolutely silent. This is effected by means of a wire loop 38 which works in a groove in the hub of the wheel 36, and its lower ends connects with a pivot 39 on the cam 37. The wire 38 is preferably a piece of piano wire, owing to its great hardness and elasticity. This wire engages the groove in the hub of the wheel 36 with the desired tension sufficient to move the cam 37, and this tension does not require to be adjusted at any time in the operation of the motor. It will be noted that when the winding shaft 6 is turned in the direction of the arrow (see Fig. 3) the friction of the wire loop 38 will move the cam 37 out of contact with the wheel 36. On the other hand when the wheel 36 tends to move in the opposite direction, this friction will draw the cam 37 backward so as to engage the wheel 36 and lock it from turning. A steel plate 40 is preferably located between the bearing of the cam 37 and the shaft 6 so as to act as a tie piece and prevent any springing of these parts when the cam 37 jams beneath the wheel 36.

It will be noted that the casing 1, surrounding the spring barrels 10 and being placed in a horizontal position permits these spring barrels to be very readily lubricated by causing them to turn in a bath of oil or grease in the lower part of the casing. In this way smoothness of operation will always be secured without any danger of sticking or chugging.

Having now described my invention what I claim as new therein and desire to secure by Letters Patent is as follows:—

1. In a spring motor for talking machines, the combination of a horizontal casing which entirely incloses the operating parts and constitutes the frame for the operating elements, an intermediate partition therein and integral therewith, spring barrels in the casing at one side of the partition, and driving and governing mechanism in the casing at the other side of the partition, substantially as set forth.

2. In a spring motor for talking machines, the combination of a horizontal casing which entirely incloses the operating parts and constitutes the frame for the operating elements, an intermediate partition therein and integral therewith, spring barrels in the casing at one side of the partition, driving and governing mechanism in the casing at the other side of the partition, and a countershaft extending through the partition and connecting the spring barrels and driving mechanism, substantially as set forth.

3. In a spring motor for talking machines, the combination of a horizontal approximately cylindrical casing which entirely incloses the operating parts and constitutes the frame for the operating elements, a series of integral bosses on said casing by which it is attached to the bed plate of the talking machine, an intermediate partition in said casing and integral therewith, spring barrels in the casing at one side of the partition, and driving and governing mechanism in the casing at the other side of the partition, substantially as set forth.

4. In a spring motor for talking machines, the combination of a horizontal casing which entirely incloses the operating parts and constitutes the frame for the operating elements, spring barrels therein, a turn-table shaft vertically mounted in fixed bearings and extending upwardly through the casing, a countershaft driven from the spring barrels and driving the turn-table shaft through worm gearing, means for adjusting the countershaft with respect to the turn-table shaft, and a governor shaft driven from the turn-table shaft by worm gearing, substantially as set forth.

5. In a spring motor for talking machines, the combination of a horizontal casing which entirely incloses the operating parts and constitutes the frame for the operating elements, spring barrels therein, a turn-table shaft vertically mounted in fixed bearings and extending upwardly through the casing, a countershaft driven from the spring barrels and driving the turn-table shaft through worm gearing, means for adjusting the countershaft at one end only with respect to the turn-table shaft, and a governor shaft driven from the turn-table shaft by worm gearing, substantially as set forth.

6. In a spring motor for talking machines, the combination of a horizontal casing which entirely incloses the operating parts and constitutes the frame for the operating elements, spring barrels therein, a turn-table shaft vertically mounted in fixed bearings and extending upwardly through the casing, a countershaft driven from the spring barrels and driving the turn-table shaft through worm gearing, means for adjusting the countershaft at one end only with respect to the turn-table shaft, a governor shaft driven from the turn-table shaft by worm gearing, and means for adjusting the governor shaft with respect to the turn-table shaft, substantially as set forth.

7. In a spring motor for talking machines, the combination of a horizontal approximately cylindrical casing which entirely incloses the operating parts and constitutes the frame for the operating elements, spring barrels and driving and governing mechanism located within the casing and a turn table shaft operated by the driving mechanism and projecting upwardly through the casing, substantially as set forth.

8. In a spring motor for talking machines, the combination of a horizontal approximately cylindrical casing which entirely incloses the working parts and constitutes the frame for the operating elements, and mechanism therein mounted in said casing for actuating the turn-table from the springs which are also mounted within said casing, substantially as set forth.

9. In a spring motor for talking machines, the combination of a horizontal approximately cylindrical casing made of a single integral die-casting which entirely incloses the working parts and constitutes the frame for the operating elements, and mechanism therein mounted in said casing for actuating the turn-table from the springs which are also mounted within said casing, substantially as set forth.

This specification signed and witnessed this eighth day of October, 1917.

LOUIS P. VALIQUET.

Witnesses:
ALTA MYERS,
H. C. JOHNSON.